US012499615B2

(12) United States Patent
Duer

(10) Patent No.: US 12,499,615 B2
(45) Date of Patent: Dec. 16, 2025

(54) SYSTEMS AND METHODS FOR 3D ACCIDENT RECONSTRUCTION

(71) Applicant: CSAA Insurance Services, Inc., Walnut Creek, CA (US)

(72) Inventor: Anthony Duer, Concord, CA (US)

(73) Assignee: CSAA Insurance Services, Inc., Walnut Creek, CA (US)

( * ) Notice: Subject to any disclaimer, the term of this patent is extended or adjusted under 35 U.S.C. 154(b) by 294 days.

(21) Appl. No.: 18/140,729

(22) Filed: Apr. 28, 2023

(65) Prior Publication Data

US 2023/0351682 A1 Nov. 2, 2023

Related U.S. Application Data

(60) Provisional application No. 63/335,908, filed on Apr. 28, 2022.

(51) Int. Cl.
*G06T 17/00* (2006.01)

(52) U.S. Cl.
CPC .......... *G06T 17/00* (2013.01); *G06T 2200/08* (2013.01); *G06T 2207/10016* (2013.01); *G06T 2207/20081* (2013.01); *G06T 2207/20084* (2013.01)

(58) Field of Classification Search
CPC ................ G06T 17/00; G06T 2200/08; G06T 2207/10016; G06T 2207/20081; G06T 2207/20084; G06T 7/0004; G06T 2207/30248; G06N 20/00; G06Q 40/08; G06V 20/40; G06V 20/50

See application file for complete search history.

(56) References Cited

U.S. PATENT DOCUMENTS

| 10,145,684 | B1 * | 12/2018 | Tofte | G06T 7/20 |
| 10,324,463 | B1 * | 6/2019 | Konrardy | G01S 19/39 |
| 11,954,315 | B1 * | 4/2024 | Megyese | G06F 30/15 |
| 2012/0076437 | A1 * | 3/2012 | King | G06Q 40/08 |
| | | | | 382/286 |
| 2016/0275790 | A1 * | 9/2016 | Kang | G06Q 10/10 |
| 2021/0160459 | A1 * | 5/2021 | Kuruvilla | H04N 7/18 |
| 2021/0312702 | A1 * | 10/2021 | Holzer | G06T 7/70 |
| 2021/0342997 | A1 * | 11/2021 | Malreddy | G06F 18/214 |

(Continued)

*Primary Examiner* — Michael Le
(74) *Attorney, Agent, or Firm* — McDonnell Boehnen Hulbert & Berghoff LLP

(57) ABSTRACT

In one aspect, an example method includes: (a) receiving a plurality of images of a particular vehicle; (b) generating an accident reconstruction model using one or more machine learning models, wherein the one or more machine learning models are configured to generate the accident reconstruction model using the received plurality of images, and wherein the accident reconstruction model indicates, for each of multiple regions on the particular vehicle, a respective extent of damage to the particular vehicle; (c) receiving a request for an accident reconstruction report for the particular vehicle; (d) based on the received request, identifying potential damage to the particular vehicle, wherein the identified potential damage is based on at least the generated accident reconstruction model; and (e) transmitting instructions that cause the mobile computing device to display a graphical indication of the potential damage to the particular vehicle.

20 Claims, 7 Drawing Sheets

(56) References Cited

U.S. PATENT DOCUMENTS

| | | | |
|---|---|---|---|
| 2022/0157031 A1* | 5/2022 | Fields | H04L 67/025 |
| 2022/0169287 A1* | 6/2022 | Beaurepaire | G01C 21/3492 |
| 2022/0245720 A1* | 8/2022 | Tofte | G01C 11/02 |
| 2022/0277510 A1* | 9/2022 | Funt | G06N 3/0499 |
| 2022/0284544 A1* | 9/2022 | Holzer | G06T 3/4038 |
| 2023/0153982 A1* | 5/2023 | Gonzalez Diaz | G06V 10/82 |
| | | | 382/100 |

* cited by examiner

SYSTEMS AND METHODS FOR 3D ACCIDENT RECONSTRUCTION

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system for an accident scene reconstruction system configured for use with a vehicle is disclosed. The example computing system comprises a mobile device comprising a camera, a network interface, and a graphical user interface. The example computing system further comprises a modeling computing device, wherein the modeling computing device comprises a processor and a non-transitory computer-readable medium, having stored thereon program instructions that, upon execution by the processor, cause the modeling computing device to perform a set of operations comprising: (a) receiving a plurality of images of a particular vehicle from the mobile computing device; (b) generating an accident reconstruction model using one or more machine learning models, wherein the one or more machine learning models are configured to generate the accident reconstruction model using the received plurality of images, and wherein the accident reconstruction model indicates, for each of multiple regions on the particular vehicle, a respective extent of damage to the particular vehicle; (c) receiving a request for an accident reconstruction report for the particular vehicle; (d) based on the received request, identifying potential damage to the particular vehicle, wherein the identified damage is based on at least the generated accident reconstruction model; and (e) transmitting, to the mobile computing device, instructions that cause the mobile computing device to display, via the user interface of the mobile computing device, a graphical indication of the potential damage to the particular vehicle.

In another aspect, an example method is disclosed. The method includes (a) receiving, by a modeling computing device, a plurality of images of a particular vehicle from a mobile computing device; (b) generating, by the modeling computing device, an accident reconstruction model using one or more machine learning models, wherein the one or more machine learning models are configured to generate the accident reconstruction model using the received plurality of images, and wherein the accident reconstruction model indicates, for each of multiple regions on the particular vehicle, a respective extent of damage to the particular vehicle; (c) receiving, by the modeling computing device, a request for an accident reconstruction report for the particular vehicle; (d) based on the received request, identifying, by the modeling computing device, potential damage to the particular vehicle, wherein the identified damage is based on at least the generated accident reconstruction model; and (e) transmitting, by the modeling computing device, to the mobile computing device, instructions that cause the mobile computing device to display, via the user interface of the mobile computing device, a graphical indication of the potential damage to the particular vehicle.

DETAILED DESCRIPTION

I. Overview

Figure 1:
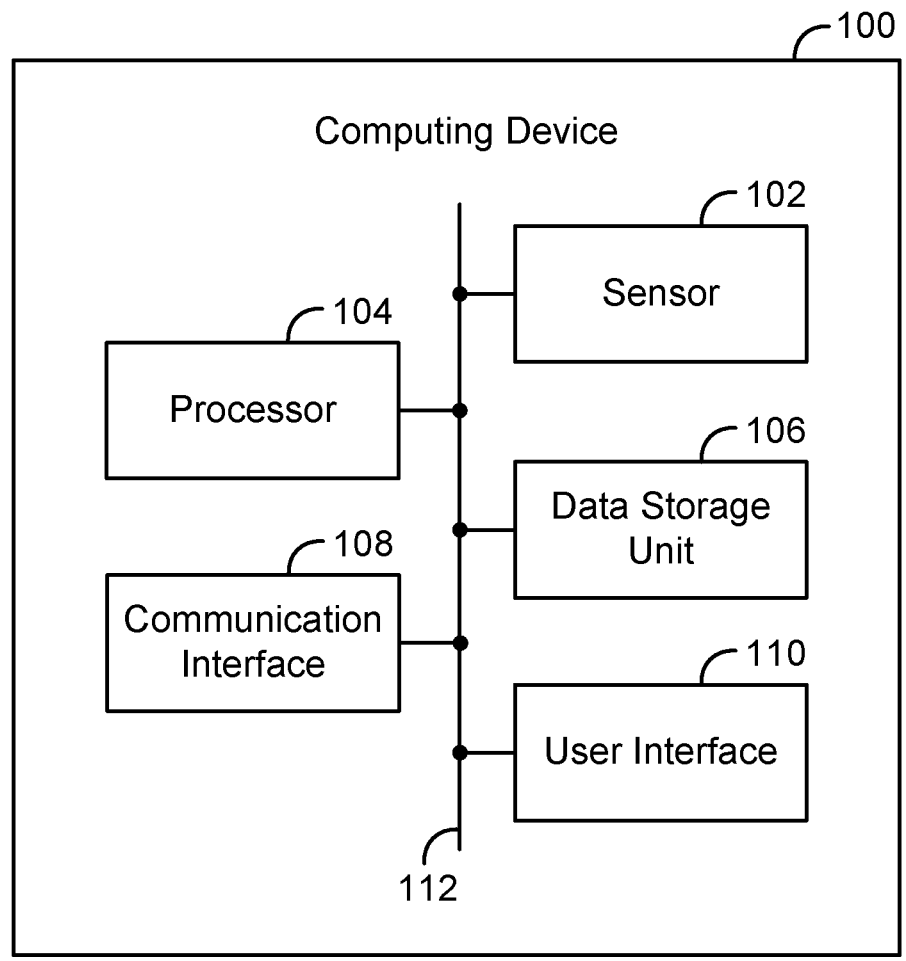
FIG. 1 is a simplified block diagram of an example computing device.

Conventionally, to evaluate when an insured motorist or property owner has suffered a loss, insurance companies send an adjuster to evaluate the extent of damage to the vehicle and/or property. However, this process of sending an adjuster to evaluate the extent of damage to the vehicle and/or property is time consuming and may result in inconsistent results, across different adjusters, different vehicles and/or property, or both.

For example, by relying on conventional methods, it is often difficult to accurately determine the extent of damage and the appropriate next steps for performing under an insurance policy (much less verify in real-time) for at least the reasons that the adjuster must visit and/or visually inspect the vehicle or property to assess the damage, create a cost and/or repair estimate for the damage, and detail all of the characteristics of the damage in one or more reports to record the loss, all of which must occur before performance is rendered under the policy. And, if certain information is missed or mischaracterized during this process, performance is only further delayed and/or performance may not be in compliance with the policy based on this erroneous information—thereby harming the policyholder, the insurance company, or both.

If, however, the insurance company could provide an efficient, effective, and novel solution for modeling accident scene reconstruction based on leveraging existing vehicle data and data recorded at the scene of the accident (or at least data associated with the affected vehicle and/or property), then the resultant experience of the policyholder and the accuracy and timing of performing under the policy would be improved.

Accordingly, features of the present disclosure can help to address these and other issues to provide an improvement to select technical fields. More specifically, features of the present disclosure help address issues within and provide improvements for select technical fields, which include for example, computer-based systems for collecting and analyzing data from mobile computing devices, and/or other sources, including image and video data associated with a particular vehicle and modeling accident scene reconstruction based on this data, and providing faster, more accurate analysis to the insurance company and the insured, which in turn improves the functionality of computing devices, software applications, and graphical user interfaces (GUIs) used by insurance companies and policyholders, as well as other entities.

More specifically, example embodiments relate to methods, systems, and devices that allow an accident scene reconstruction system configured for use with a vehicle to assess various attributes associated with a particular vehicle that has potentially sustained damage by leveraging one or more camera technologies (e.g., a short video of the damaged vehicle taken by a mobile computing device at the scene the accident, etc.) and data associated with the particular vehicle that has been collected before the damage was incurred (e.g., video and/or image data of one or more vehicles that are similar to the damaged vehicle, etc.).

To facilitate this analysis, the accident scene reconstruction system may use one or more components to carry out various steps of this process. For example, the accident scene reconstruction system may include a modeling computing device (e.g., a cloud-based computing device that receives data from a number of sources and uses a machine learning model to create one or more models based on the received data) and a mobile computing device (e.g., a smartphone associated with a vehicle operator and/or passenger). These computing devices can be used to perform various operational functions within the accident scene reconstruction system to determine and display various attributes associated with damage inflicted on the vehicle, as well as further actions that should be undertaken by the insurance company, the policyholder, or both.

In one aspect, the modeling computing device may collect data associated with a particular vehicle from one or more resources. This data may include data from public and/or private databases associated with the particular vehicle, as well as other resources associated with the particular vehicle (e.g., sensor data from the vehicle, operating manuals and/or technical specification materials associated with the particular vehicle, sensors on the vehicle, geolocation and/or map data associated with the particular vehicle, a computing device associated with the particular vehicle, etc.). In some examples, this data may include images, videos, and other data associated with the particular vehicle (e.g., one or more three-dimensional computing models of the particular vehicle).

In a further aspect, in example embodiments, the modeling computing device may collect sensor data from one or more sensors on one or more vehicles that share attributes with the particular vehicle (e.g., same make, model, and/or year as the particular vehicle). This sensor data may include data from one or more sensors, including: (i) GPS sensors (e.g., to determine a geographic location of the vehicle at the time of an accident); (ii) accelerometer sensors (e.g., to determine speed and/or direction of the vehicle at the time of an accident); (iii) collision sensors; and (iv) camera sensors (e.g., to determine various aspects of the vehicle's surroundings and/or conditions around and/or inside the vehicle at the time of an accident), among other possibilities.

In one aspect, the modeling computing device may collect data associated with a particular vehicle from one or more mobile computing devices associated with the particular vehicle. In some examples, this data may include one or more images and/or videos of the particular vehicle. In some example embodiments, these images and/or videos of the particular vehicle may have been captured before an accident involving the particular vehicle, after an accident involving the particular vehicle, or both. Other examples are possible.

In example embodiments, once the modeling computing device collects data from various resources, the modeling computing device may also generate and maintain one or more programs to interpret this data (e.g., one or more programs securely stored on a server and/or database associated with the modeling computing device and/or insurance company). For example, the modeling computing device may use one or more machine learning models to interpret this data and generate one more models based on this collected data.

For example, the modeling computing device may use image and/or video data associated with a particular vehicle to utilize and/or train a Neural Radiance Fields (NeRF) machine learning model to generate an accident reconstruction model that indicates a 3D scene reconstruction of the particular vehicle from a series of 2D images (e.g., a video). In this regard, NeRF models may allow high accuracy and dynamic scenes to be reconstructed using a series of images and/or short video clips. Once the initial NeRF model is generated, the model may be trained and its accuracy may be further improved by ingesting data that is associated with a particular vehicle, including data associated with the particular vehicle (e.g., image and/or video data of the particular vehicle), a vehicle that shares one or more attributes with the particular vehicle (e.g., image and/or video data of a vehicle that is the same make, model, and/or year of the particular vehicle), and/or both.

In an example embodiment, a first NeRF model may be trained on data associated with the particular vehicle prior to an accident (e.g., image and/or video data of the particular vehicle prior to an accident) and a second NeRF model may be trained on data associated with the particular vehicle after the accident (e.g., image and/or video data of the particular vehicle after the accident). In a further aspect, the data associated with the particular vehicle after the accident may be collected in a manner that leads to the highest correlation to the data collected before the accident. For example, based on the data collected before the accident, the modeling computing device may request that the data collected after the accident (e.g., by a mobile computing device associated with the particular vehicle) be collected in a specific manner. For example, the modeling computing device may request that the mobile computing device record a short video of the particular vehicle at one or more relative positions, distances, and/or angles between a camera of the mobile computing device and the particular vehicle in three-dimensional space. Other examples are possible.

In a further aspect, in example embodiments, once the NeRF models are trained on their respective data, each of the NeRF models may produce one or more images, depth maps, and/or virtual renderings (two dimensional and/or three dimensional), of the particular vehicle. These one or more images, depth maps, and/or virtual renderings may be utilized to determine areas on the particular vehicle where one or more structural features of the particular vehicle has changed between the pre- and post-accident scenes, as well as indicate that damage has potentially occurred. For example, if a passenger door of the particular vehicle is a particular distance away from the camera and/or in a particular orientation/angle compared to the camera (e.g., 30 feet away at a certain orientation) in a reconstructed scene based on the first NeRF model and another distance away from the camera (e.g., 31 feet at the same certain orientation) in a reconstructed scene based on the second NeRF model, then a deformation of the passenger door may be inferred, which may indicate damage to the passenger door.

In a further aspect, in an example embodiment, a party associated with the damaged vehicle (e.g., an insurance adjuster associated with the damaged vehicle) may then use a computer with a 3D application (or VR headset) to remotely view the damaged vehicle based on these models, and may even be able to view the damaged vehicle from multiple angles displayed within the reconstructed scene, thereby allowing the party to move through the virtual scene.

Utilizing NeRF models may provide one or more distinct benefits to the accident reconstruction system, including that, rather than creating a generalized model that can be applied to any scene, NeRF models can be trained on one scene only, which removes the requirement for large training datasets and, instead, allows a single video to train the model. Additionally, because the data required to accurately train and utilize a NeRF model (e.g., color (RGB), Angle, and Depth) to reproduce a particular scene is small compared to traditional 3D models, objects, and textures, the methods and systems detailed herein can be utilized by any number of typical computing devices, including mobile computing devices (e.g., smartphones, laptop computing devices, etc.). Furthermore, although the NeRF model has been detailed herein, it should be readily apparent to those of ordinary skill in the art that other machine learning models may be used in the example embodiments detailed herein.

For example, the NeRF model may be used in addition to or alternatively from simultaneous localization and mapping (SLAM) and/or structure-from-motion (SfM) machine learning models, among other possibilities.

II. Example Architecture and Operations

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a sensor 102, a processor 104, a data storage unit 106, a communication interface 108, and/or a user interface 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The sensor 102 can include sensors now known or later developed, including but not limited to accelerometer sensors, a sound detection sensor, a motion sensor, a humidity sensor, a temperature sensor, a proximity sensor (e.g., a Bluetooth sensor and/or communication protocol to determine the proximity of a mobile computing device that is associated with the vehicle owner), a location sensor (e.g., a GPS sensor), time sensors (e.g., a digital clock), collision sensors (e.g., an air bag deployment sensor, impact sensors in the body of the vehicle, etc.), camera sensors (e.g., cameras on a mobile computing device), device interaction sensors (e.g., a touch screen and/or retinal scanner on a mobile computing device, such as a smartphone), and/or a combination of these sensors, among other possibilities.

The processor 104 can include a general-purpose processor (e.g., a microprocessor) and/or a special-purpose processor (e.g., a digital signal processor (DSP)). The processor 104 can execute program instructions included in the data storage unit 106 as discussed below.

The data storage unit 106 can include one or more volatile, non-volatile, removable, and/or non-removable storage components, such as magnetic, optical, and/or flash storage, and/or can be integrated in whole or in part with the processor 104. Further, the data storage unit 106 can take the form of a non-transitory computer-readable storage medium, having stored thereon program instructions (e.g., compiled or non-compiled program logic and/or machine code) that, upon execution by the processor 104, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 108 and/or the user interface 110. The data storage unit 106 can also store other types of data, such as those types described in this disclosure.

The communication interface 108 can allow the computing device 100 to connect with and/or communicate with another entity, such as another computing device, according to one or more protocols. In one example, the communication interface 108 can be a wired interface, such as an Ethernet interface. In another example, the communication interface 108 can be a wireless interface, such as a cellular or WI-FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 110 can include hardware and/or software components that facilitate interaction between the computing device 100 and a user of the computing device 100, if applicable. As such, the user interface 110 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile smartphone. Additionally, as used herein, "mobile computing device" describes computing devices that are highly mobile (including a laptop, a tablet, and/or a mobile phone), as well as computing devices that are not as mobile (including a desktop computer, etc.). In a further aspect, the features described herein may involve some or all of these components arranged in different ways, including additional or fewer components and/or different types of components, among other possibilities.

B. Accident Reconstruction System Configured for Use with a Vehicle

FIG. 2A is an example accident reconstruction system 200 configured for use with a vehicle. The accident reconstruction system 200 can perform various acts and/or functions related to collecting vehicle sensor data from a particular vehicle, video and/or image data of the particular vehicle from one or more mobile computing devices, and/or data associated with the particular vehicle to generate an accident reconstruction model for the particular vehicle and take one or more responsive actions to address damage incurred to the particular vehicle, and can be implemented as a computing system. In this disclosure, the term "computing system" means a system that includes at least one computing device, such as computing device 100. In some instances, a computing system can include one or more other computing systems.

It should also be readily understood that computing device 100, accident reconstruction 200, and any of the components thereof, can be physical systems made up of physical devices, cloud-based systems made up of cloud-based devices that store program logic and/or data of cloud-based applications and/or services (e.g., for performing at least one function of a software application or an application platform for computing systems and devices detailed herein), or some combination of the two.

In accordance with example embodiments, the accident reconstruction system 200 can include various components, such as a modeling computing device 202 (shown here as a cloud-based computing device), vehicle database 204, vehicle sensors 206, and a mobile computing device 208, each of which can be implemented as a computing system or part of a computing system. In some examples, the modeling computing device and the mobile computing device are the same computing device. In other examples, the modeling computing device and the mobile computing device are different computing devices.

The accident reconstruction system 200 can also include connection mechanisms (shown here as lines with arrows at each end (i.e., "double arrows"), which connect modeling computing device 202, vehicle database 204, vehicle sensors 206, and a mobile computing device 208, and may do so in a number of ways (e.g., a wired mechanism, wireless mechanisms and communication protocols, etc.).

In practice, the accident reconstruction system 200 is likely to include many of some or all of the example components described above, such as the modeling computing device 202, vehicle database 204, vehicle sensors 206, and a mobile computing device 208.

The accident reconstruction system 200 and/or components thereof can perform various acts and/or functions (many of which are described above). Examples of these and related features will now be described in further detail.

Within accident reconstruction system 200, modeling computing device 202 may collect data from a number of sources.

In one example, modeling computing device 202 may collect data from vehicle database 204 concerning a particular vehicle (e.g., accident history reports on the particular vehicle, mileage of the particular vehicle, the vehicle identification number (VIN) of the particular vehicle, etc.) and/or a vehicle or vehicles that share one or more attributes of the particular vehicle (e.g., same manufacturer, model, and/or year of the particular vehicle, same or similar color of the particular vehicle, etc.).

In another example, modeling computing device 202 may collect data from one or more vehicle sensors 206 on the particular vehicle and/or vehicles that share one or more attributes with the particular vehicle. This vehicle sensor data may include data from one or more of the following, and or all of which may be located on devices within and/or outside of the particular vehicle: (i) GPS sensors; (ii) accelerometer sensors; (iii) collision sensors; and (iv) camera sensors, among other possibilities. For example, in an example embodiment, vehicle sensors may be used to generate and/or supplement other data acquired by the accident reconstruction system. In one example, accelerometer data from the vehicle after an accident may be collected to isolate the point of impact and, potentially, dismiss damage on the wrong side of the vehicle as pre-existing (e.g. if the vehicle was hit on the driver's side and didn't hit anything else, damage to the passenger side may have been pre-existing and not covered by this accident). In a further aspect, camera sensor on the vehicle may be used to update and/or reconstruct the scene of the accident just prior to collision, thereby supplementing other scene data acquired by the system. Other examples are possible.

For example, modeling computing device 202 may collect data from one or more mobile computing devices (e.g., used in connection with one or more vehicles) associated with the particular vehicle, including the mobile computing device 208 in and/or around the particular vehicle. In some examples, this mobile computing device 208 may contain one or more cameras that capture images and/or videos of the particular vehicle, before and/or after an accident. In some examples, a party may use a mobile computing device capture a video of the particular vehicle after an accident and upload it one or more resources for further analysis by the accident reconstruction system 200 (e.g., modeling computing device 202). In some examples, this mobile computing device 208 may belong to a driver of the particular vehicle, the policyholder, or another party associated with the vehicle (e.g., camera sensor installed in the vehicle itself), among other possibilities.

Once the modeling computing device 202 collects data from vehicle database 204, vehicle sensors 206, and/or a mobile computing device 208, the modeling computing device 202 may generate one or more accident reconstruction models using one or more machine learning models (e.g., NeRF, SLAM, and/or SfM models, among other possibilities). In example embodiments, these accident reconstruction models may be constructed using any or all of the data collected from the vehicle database 204, vehicle sensors 206, and a mobile computing device 208, and/or other sources. In some examples, the modeling computing device may analyze the plurality of captured images or video, extracts frames, and processes it into a one or more models (e.g., a NeRF model) to reconstruct the scene in two- or three-dimensional renderings and/or models.

In one example, the modeling computing device 202 may train one NeRF model using data associated with the particular video before an accident and one NeRF model using data associated with the particular video after an accident. In a further aspect, the modeling computing device may utilize one or more images, depth maps, and/or virtual renderings associated with each of the NeRF models to compare and determine areas on the particular vehicle where one or more structural features of the particular vehicle has changed between the pre- and post-accident scenes, thereby using the accident reconstruction models to indicate a respective extent of damage to the particular vehicle for each of multiple regions on the particular vehicle.

For example, the two models may be aligned from a particular angle or point of view (e.g., a canonical point-of-view) such that the two models overlap. Further processing may be undertaken based on this alignment, including the subtraction of the two depth maps associated with the two models, which may indicate difference between the two models (e.g., indicating where, potentially, damage has occurred to the vehicle). Put another way, in example embodiments, the camera capturing the plurality of images in each model may be aligned so that the camera in each model is directed at the vehicle from the same direction and at the same distance, height, and orientation, as compared to the vehicle, the ground, etc. If a further aspect, if all factors are equal in capturing images between the two models, then resultant analysis from each model (e.g., depth maps) would be equal and any deviations from that unity of the models may imply that something about the vehicle has changed (e.g., damage).

Furthermore, the accident reconstruction model may be updated over time based on further data collected from the vehicle database 204, vehicle sensors 206, and a mobile computing device 208, and/or other sources. Additionally, the accident reconstruction model may be used to update the data sources from which it has collected data (e.g., updating the vehicle database 204 with an indication of an accident involving the particular vehicle), as well as data sources from which it may not have collected data.

After the accident reconstruction model is generated and/or regenerated by the modeling computing device 202, the modeling computing device may receive a request accident reconstruction report for the particular vehicle. In a further aspect, this request may come from the mobile computing device 208 and/or other sources (including a desktop computing device associated with a claims adjuster).

In one example, once the request is received by the modeling computing device 202, the modeling computing device 202 may identify potential damage to the particular vehicle based on the data received from the mobile computing device 208 (e.g., a plurality of images of the vehicle after an accident) and/or one or more accident reconstruction models. In another example, the modeling computing device 202 may not be able to accurately identify the damage to the particular vehicle based on insufficient data.

For example, in some embodiments, the modeling computing device 202 may determine that a plurality of images received from the mobile computing device 208 of the vehicle after an accident need to be retaken and/or reuploaded to the modeling computing device 202 for further analysis. In response, the modeling computing device 202 may transmit one or more instructions (e.g., to the mobile computing device 208) to correct the insufficient data. In one example, the modeling computing device 202 may transmit one or more instructions to the mobile computing device 208 that captured the plurality of images of the vehicle after the accident to capture additional and/or alternative images, and may provide instructions to a user of the mobile computing device 208 on how to do so (e.g., "PLEASE STAND APPROXIMATELY 30 FEET DIRECTLY FROM THE DRIVER'S SIDE DOOR AND CAPTURE A SHORT VIDEO OF THE DOOR, AT A HEIGHT OF FOUR FEET FROM THE GROUND"). In this regard, modeling computing device 202 can send suggestion prompts and updated suggestion prompts to the mobile computing device 208 to further facilitate the generation and regeneration of the accident reconstruction models, as well as the identification of potential damage to the vehicle based on these models.

Once the modeling computing device 202 has identified the potential damage to the particular vehicle, the modeling computing device 202 may transmit instructions that cause a computing device (e.g., the modeling computing device 202, a mobile computing device 208, or both) to display one or more graphical indications of the potential damage to the particular vehicle.

Other computational actions, displayed graphical indications, alerts, and configurations are possible.

Figure 3A:
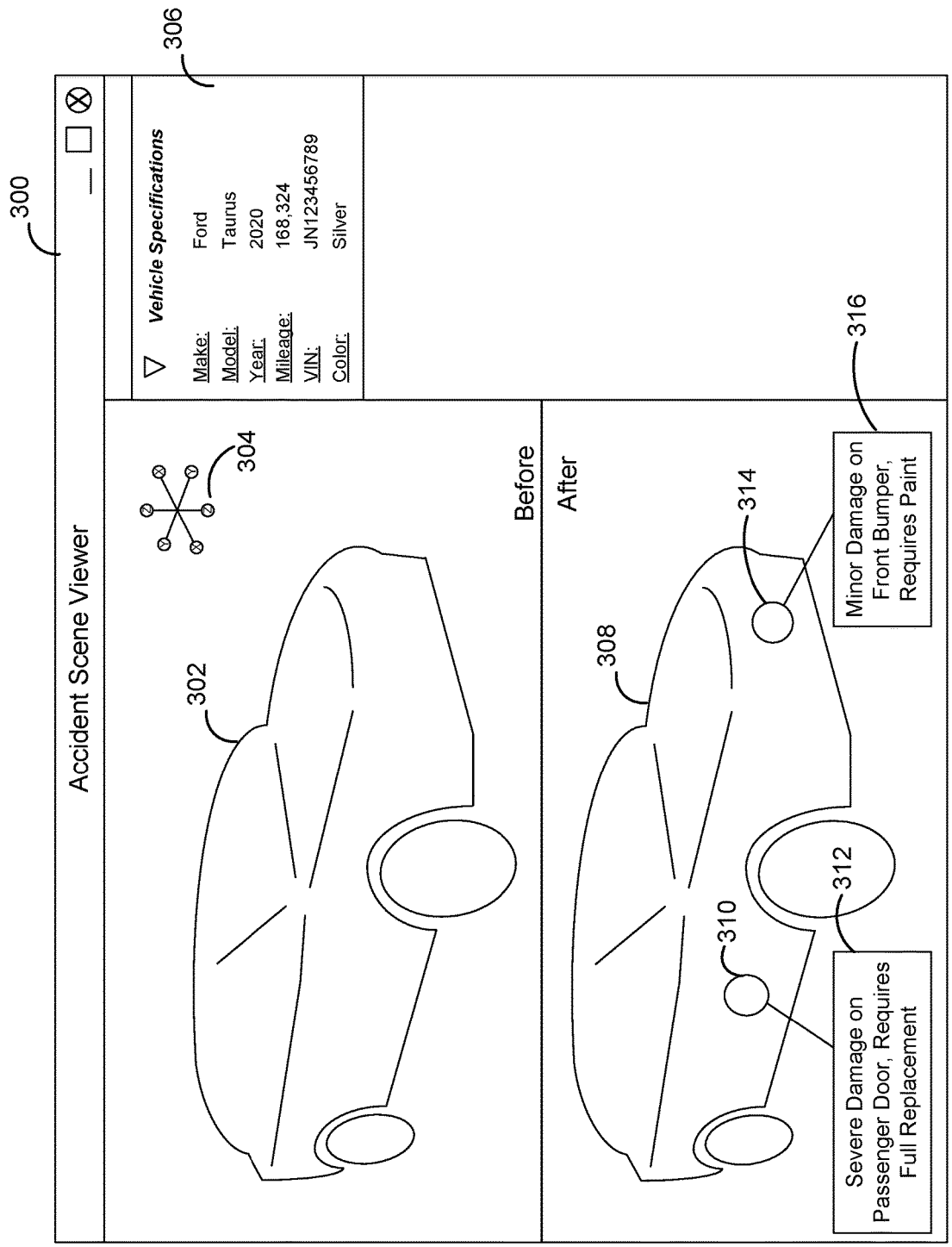
FIG. 3A is an example mobile device of an accident reconstruction system and graphical user interface in a first state.
Figure 3B:
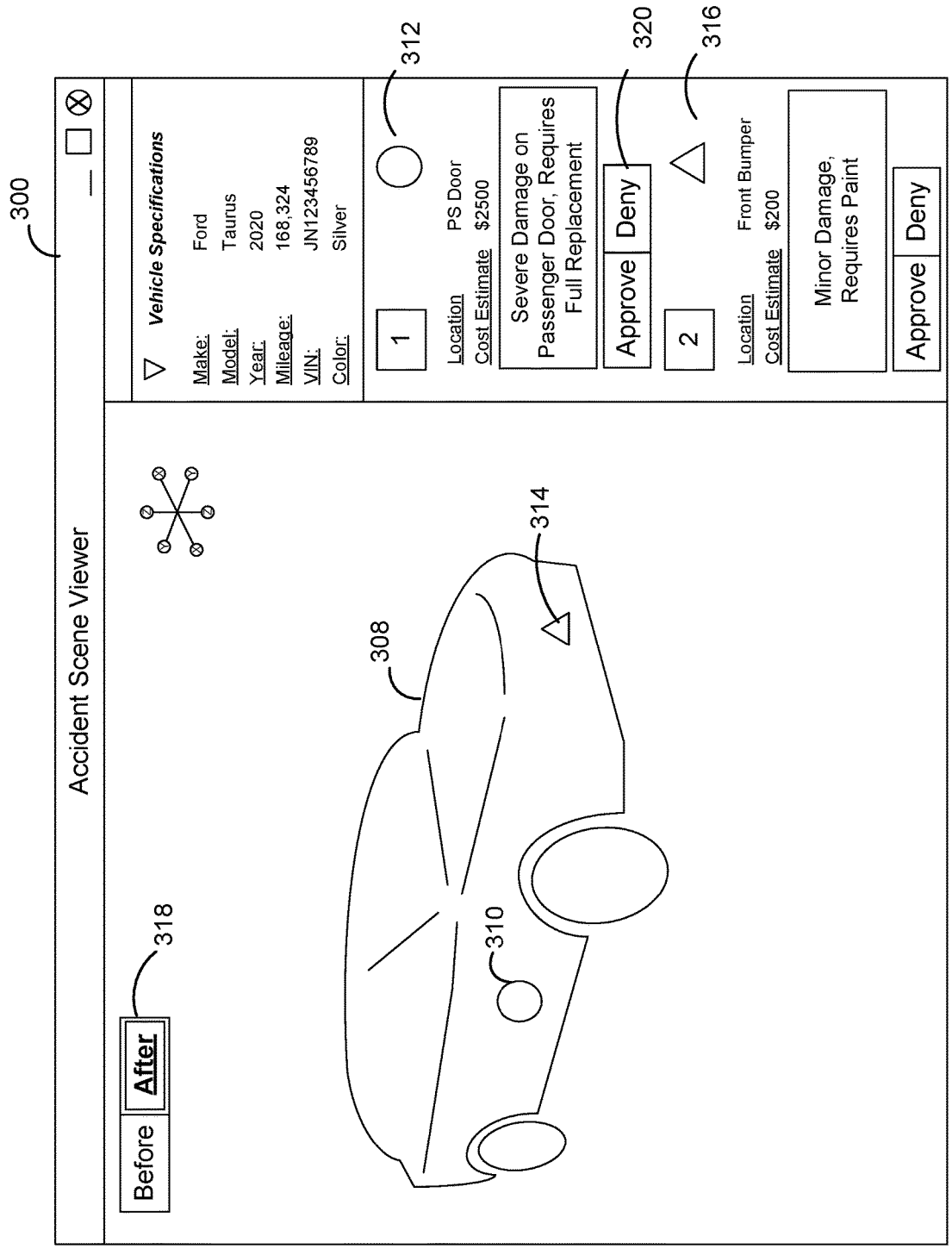
FIG. 3B is the example mobile device of the accident reconstruction system and graphical user interface of FIG. 3A, but in a second state.

C. Example Mobile Device of the Navigation System and Graphical User Interfaces To further illustrate the above-described concepts and others, FIGS. 3A-3B depict a graphical user interface, in accordance with example embodiments. Although illustrated in FIGS. 3A-3B as being displayed via a user interface of a mobile computing device (a laptop computer), this graphical user interface may be provided for display by one or more components described in connection with accident reconstruction system 200 (e.g., via a user interface of mobile computing device 208), among other possibilities.

Figure 2:
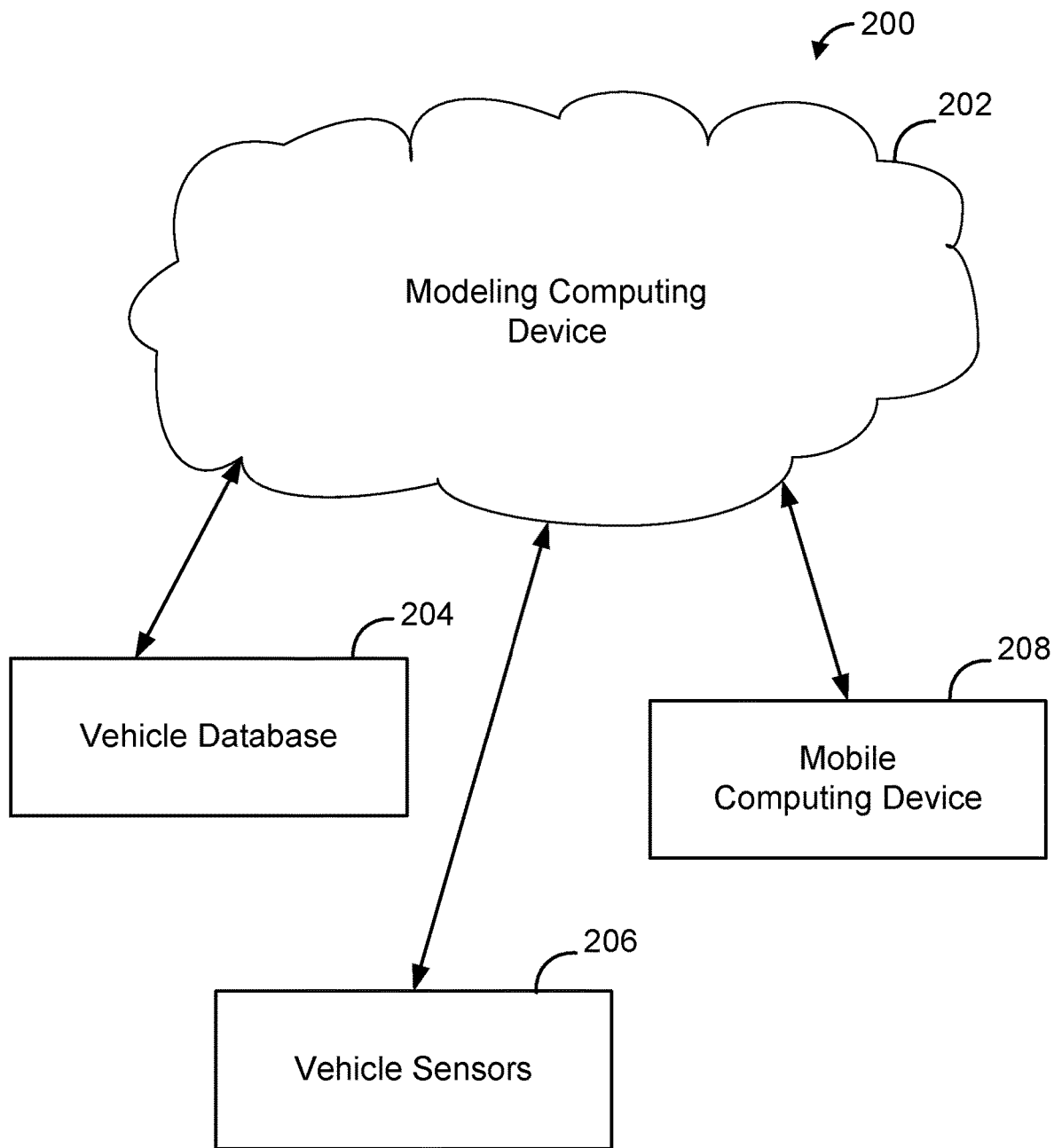
FIG. 2 is an example accident reconstruction system configured for use with a vehicle.

The information displayed by the graphical user interfaces may also be derived, at least in part, from data stored and processed by the components described in connection with accident reconstruction system 200, and/or other computing devices or systems configured to generate such graphical user interfaces and/or receive input from one or more users (e.g., those described in connection with accident reconstruction system 200, as well as the components of FIGS. 1 and 2). In other words, this graphical user interface is merely for the purpose of illustration. The features described herein may involve graphical user interfaces that format information differently, include more or less information, include different types of information, and relate to one another in different ways.

In accordance with an example embodiment, FIGS. 3A-3B depict an example graphical user interface 300 in various states. Graphical user interface 300 includes visual representations that notify the user of a computing device associated with a particular vehicle, the accident reconstruction system, or both that one or more potential areas of damage have been detected on the particular vehicle and presents the user with visual indications of areas and extent of damage associated with the particular vehicle and/or various suggestion prompts for addressing the areas of damage on the vehicle that may be taken in response to the detected information.

Specifically, in the context of FIG. 3A, FIG. 3A depicts an example graphical user interface 300 illustrated in a first state. In FIG. 3A, graphical user interface 300 displays a first rendering 302 of the vehicle, which allows the user of the mobile computing device to view the particular vehicle in a non-annotated state. In some example embodiments, the first rendering 302 of the vehicle may indicate a state of the particular vehicle prior to an accident. In other examples, the first rendering 302 of the vehicle may indicate a state of a vehicle similar to the particular vehicle (e.g., a vehicle with the same or similar make/manufacturer, model, year, mileage, and/or color of the vehicle) prior to an accident. In some example embodiments, the first rendering 302 of the vehicle may indicate a state of the particular vehicle after an accident, but before any annotations indicating the extent of damage to the particular vehicle have been applied. In a further aspect, the first rendering 302 of the vehicle may be generated based on one or more of the models described in further detail above (e.g., NeRF, SLAM, and/or SfM models), as well as other two- and three-dimensional modeling programs, among other possibilities.

In a further aspect, navigation icon 304 may allow the user the mobile computing device to rotate and view alternate angles of the particular vehicle in a non-annotated state (illustrated here as controlling the first rendering 302 of the vehicle in the "X", "Y", and "Z" coordinate directions).

In a further aspect, in example embodiments, vehicle attributes panel 306 may display one or more attributes of the particular vehicle, one or more vehicles that have same or similar attributes of the particular vehicle, or both (illustrated in FIG. 3A as "Make: Ford", "Model: Taurus", "Year: 2020", "Mileage: 168,324", "VIN: JN123456789", and "Color: Silver"). In example embodiments, one or more these attributes may be displayed via graphical user interface 300 via vehicle attributes panel 306 based on the comparative analysis undertaken by a modeling computing device. For example, one or more of these attributes may be displayed based on the accident reconstruction system 200 generating the first rendering 302 of the vehicle via one or more of the methods described above and below. In other examples, one or more of these attributes may be entered by a user of the graphical user interface 300 via vehicle attributes panel 306, which in turn may cause the accident reconstruction system 200 to generate or regenerate the first rendering 302 of the vehicle (e.g., by collecting data stored in association with the particular vehicle, one or more vehicles that share one or more attributes with the particular vehicle, or both).

In a further aspect, as illustrated in FIG. 3A, graphical user interface 300 displays a second rendering 308 of the vehicle, which allows the user of the mobile computing device to view the particular vehicle in an annotated state. In example embodiments, the second rendering 308 of the vehicle may be generated based on one or more of the models described in further detail above (e.g., NeRF, SLAM, and/or SfM models), as well as other two- and three-dimensional modeling programs, including by comparing two models and annotating the differences between the two models. In some example embodiments, the second rendering 308 of the vehicle may be based on comparing two NeRF models of the vehicle (e.g., one before and one after an accident) to determine a state of the particular vehicle after an accident, including the potentials areas on the particular vehicle where one or more structural features of the particular vehicle have changed between a time before and a time after the accident for each of multiple regions on the particular vehicle.

For example, FIG. 3A shows a first damage area annotation 310 and an associated first suggestion prompt 312, which details the both the extent of the damage and a suggestion for how to address the damage detected by accident reconstruction system 200 ("Severe Damage on Passenger Door, Requires Full Replacement"). FIG. 3A also shows a second damage area annotation 314 and an associated second suggestion prompt 316, which details the both the extent of the damage and a suggestion for how to address another area of damage detected by accident reconstruction system 200 ("Minor Damage on Front Bumper, Requires Paint"). In a further aspect, in example embodiments, the first and/or second renderings of the vehicle may be generated based on one or more of the models described in further detail above (e.g., NeRF, SLAM, and/or SfM models), as well as other two- and three-dimensional modeling programs, among other possibilities.

For example, the first rendering 302 of the vehicle may be based on a first NeRF model and indicate a state of a vehicle similar to the particular vehicle (e.g., a vehicle with the same or similar make/manufacturer, model, year, mileage, and/or color of the vehicle) or the particular vehicle prior to an accident. In a further aspect, the second rendering 308 of the vehicle may be based on a second NeRF model and may indicate a state of the particular vehicle after an accident. In example embodiments, the second rendering 308 of the vehicle may include annotations indicating the extent of damage to the particular vehicle and may be based on comparing the two NeRF models and annotating the differences, as well as supplementing these annotations with other data from the accident reconstruction system 200 (e.g., the extent of damage to the particular vehicle based on data associated with similar vehicles that have not been in an accident). Other examples are possible.

For example, the first rendering 302 of the vehicle may be based on a first NeRF model and indicate a state of the particular vehicle after an accident, but before the annotations of the second rendering 308 of the vehicle have been applied. In a further aspect, in this example embodiment, the second rendering 308 of the vehicle may be based on the same first NeRF model and used to annotate the extent of damages to the vehicle and provide prompts for addressing the damage, as well as supplementing these annotations with other data from the accident reconstruction system. Other examples are possible.

For example, in some example embodiments, the user of the graphical user interface 300 may interact the annotations for a variety of purposes. For example, after the annotations are provided via interface 300, the user may further annotate potential areas of damage to the vehicle and request information for addressing the damage, as well as supplement existing annotations with other data (e.g., information on the affected vehicle). Other examples are possible In a further aspect, navigation icon 304 may allow the user the mobile computing device to rotate and view alternate angles of the particular vehicle in an annotated state (illustrated here as controlling the first rendering 302 of the vehicle in the "X", "Y", and "Z" coordinate directions).

In a further aspect, in example embodiments, vehicle attributes panel 306 may display one or more attributes of the annotated rendering of the particular vehicle via vehicle attributes panel 306 based on the comparative analysis undertaken by a modeling computing device of the illustrated system. For example, one or more of these attributes may be displayed based on the accident reconstruction system 200 generating the second rendering 308 of the vehicle via one or more of the methods described above and below. In other examples, one or more of these attributes may be entered by a user of the graphical user interface 300 via vehicle attributes panel 306, which in turn may cause the accident reconstruction system 200 to generate or regenerate the second rendering 308 of the vehicle (e.g., by collecting data stored in association with the particular vehicle, one or more vehicles that share one or more attributes with the particular vehicle, or both). Other examples are possible.

Turning to FIG. 3B, FIG. 3B depicts the example graphical user interface 300 illustrated in a second state. In FIG. 3B, the user may select between the first rendering 302 and the second rendering 308 via prompt 318 (in FIG. 3B, the user has selected the second rendering 308 via prompt 318) and graphical user interface 300 displays additional information pertaining the extent of damages to the vehicle and provides estimates for addressing the damage (including the "Location" of the potentially damaged areas, as well as an "Cost Estimate" associated with addressing the potential damage associated with each of the potentially damaged areas). In example embodiments, these annotations may be based on additional data from the accident reconstruction system 200 (e.g., costs associated with addressing the damage to the particular vehicle based on data associated with addressing similar damages on similar vehicles in the past, quotes for addressing the damage to the particular vehicle based on vendor bids, etc.). In other examples, the user may input one or more portions of this information as well (e.g., an adjuster may enter or update the costs associated with repairing the vehicle). Other examples are possible.

In FIG. 3B, processing prompts 320 (illustrated as "Approve" and "Deny") are displayed that corresponds to each of the areas of identified potential damage and allow the user of graphical user interface 300 to select whether each of the two areas of damage are approved for processing and/or payment based on the displayed information (e.g., cost, estimated extent of damage, etc.).

Figure 4:
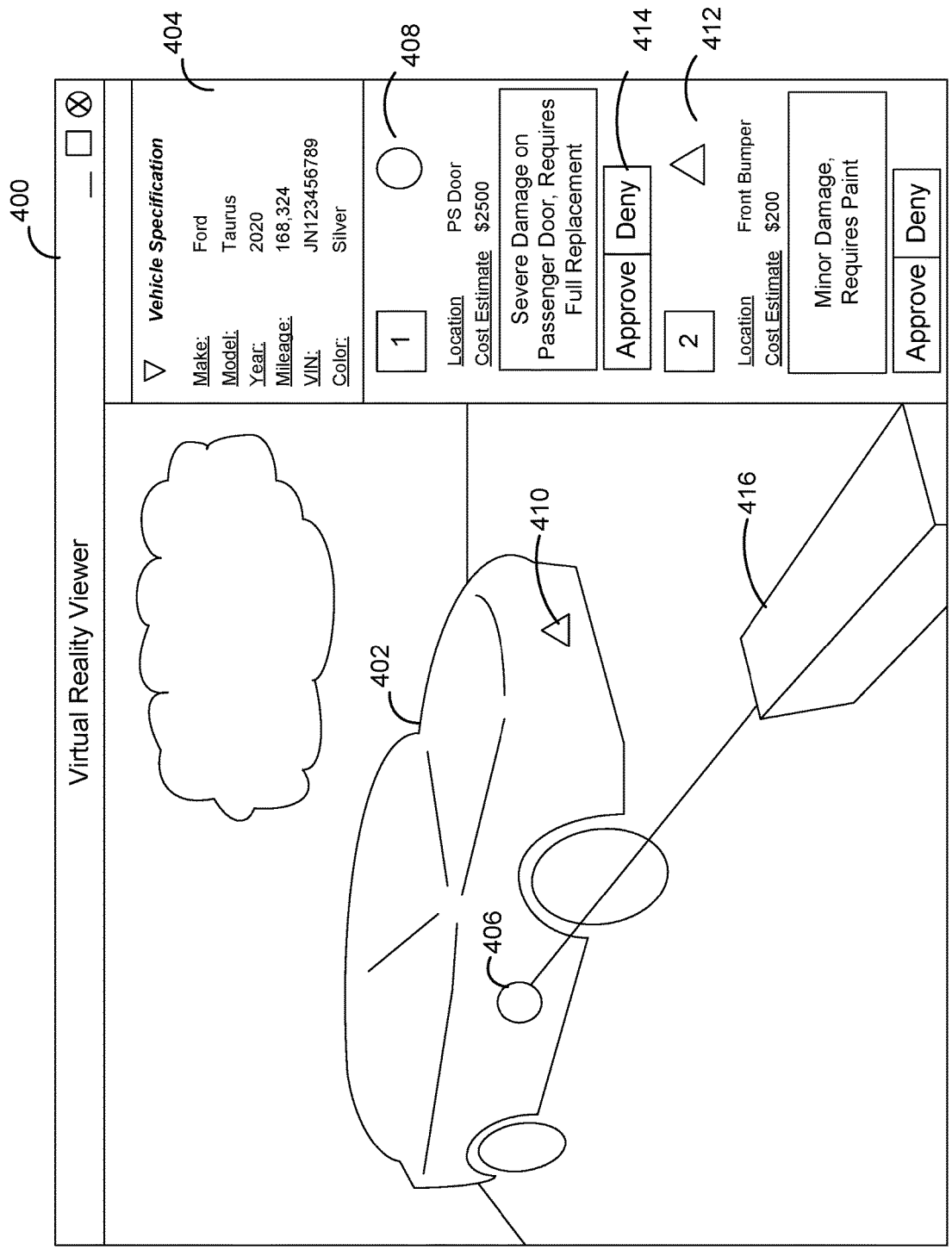
FIG. 4 is an example mobile device of an accident reconstruction system and graphical user interface.

To further illustrate the above-described concepts and others, FIG. 4 depicts a graphical user interface, in accordance with example embodiments. Although illustrated in FIG. 4 as being displayed via a user interface of a mobile computing device (a laptop computer), this graphical user interface may be provided for display by one or more components described in connection with accident reconstruction system 200 (e.g., via a user interface of mobile computing device 208), among other possibilities.

The information displayed by the graphical user interfaces may also be derived, at least in part, from data stored and processed by the components described in connection with the accident reconstruction system 200, graphical user interface 300, and/or other computing devices or systems configured to generate such graphical user interfaces and/or receive input from one or more users (e.g., those described in connection with accident reconstruction system 200, as well as the components of FIGS. 1, 2, and/or 3A-3B). In other words, this graphical user interface is merely for the purpose of illustration. The features described herein may involve graphical user interfaces that format information differently, include more or less information, include different types of information, and relate to one another in different ways.

Turning to FIG. 4A, FIG. 4A, depicts an example graphical user interface 400 in a virtual reality state. Interface 400 includes visual representations that notify the user of a computing device associated with a particular vehicle, the accident reconstruction system, or both that one or more potential areas of damage have been detected on the particular vehicle and presents the user with visual indications of areas and extent of damage associated with the particular vehicle and/or various suggestion prompts for addressing the areas of damage on the vehicle that may be taken in response to the detected information.

In FIG. 4, graphical user interface 400 displays a virtual reality rendering of the vehicle 402, which allows the user of the mobile computing device to view and interact with the particular vehicle in an annotated state. In example embodiments, the virtual reality rendering of the vehicle 402 may be generated based on one or more of the models described in further detail above (e.g., NeRF, SLAM, and/or SfM models), as well as other two- and three-dimensional modeling programs, including by comparing two models and annotating the differences between the two models. In some example embodiments, the virtual reality rendering of the vehicle 402 may be based on comparing two NeRF models of the vehicle (e.g., one before and one after an accident) to determine a state of the particular vehicle after an accident, including the potential areas on the particular vehicle where one or more structural features of the particular vehicle have changed between a time before and a time after the accident for each of multiple regions on the particular vehicle.

For example, FIG. 4 shows a first damage area annotation 406 and an associated first suggestion prompt 408, which details the both the extent of the damage and a suggestion for how to address the damage detected by accident reconstruction system 200 ("Severe Damage on Passenger Door, Requires Full Replacement"). FIG. 4 also shows a second damage area annotation 410 and an associated second suggestion prompt 412, which details the both the extent of the damage and a suggestion for how to address another area of damage detected by accident reconstruction system 200 ("Minor Damage on Front Bumper, Requires Paint").

In example embodiments, the virtual reality rendering of the vehicle 402 may include annotations indicating the extent of damage to the particular vehicle and may be based on comparing one or more NeRF models and annotating the differences, as well as supplementing these annotations with other data from the accident reconstruction system 200 (e.g., the extent of damage to the particular vehicle based on data associated with similar vehicles that have not been in an accident). Other examples are possible.

In example embodiments, graphical user interface 400 displays additional information pertaining the extent of damages to the vehicle and provides estimates for addressing the damage and these annotations may be based on additional data from the accident reconstruction system 200 (e.g., costs associated with addressing the damage to the particular vehicle based on data associated with addressing similar damages on similar vehicles in the past, quotes for addressing the damage to the particular vehicle based on vendor bids, etc.). In other examples, the user may input one or more portions of this information as well (e.g., an adjuster may enter or update the costs associated with repairing the vehicle). Other examples are possible.

In FIG. 4, processing prompts 414 are displayed and correspond to each of the areas of identified potential damage and allow the user of graphical user interface 400 to select whether each of the two areas of damage are approved for processing and/or payment based on the displayed information (e.g., cost, estimated extent of damage, etc.). Other examples are possible.

In a further aspect, virtual reality controller 416 may allow the user the mobile computing device to rotate and view alternate angles of the particular vehicle in an annotated state, as well as view the vehicle in the context of the scene in which the damage occurred (illustrated here as controlling the virtual reality rendering of the vehicle 402 in the area and/or geographical location of the vehicle at or near after the time of the accident).

In a further aspect, in example embodiments, vehicle attributes panel 404 may display one or more attributes of the annotated rendering of the particular vehicle via vehicle attributes panel 404 based on the comparative analysis undertaken by a modeling computing device of the illustrated system. For example, one or more of these attributes may be displayed based on the accident reconstruction system 200 generating the virtual reality rendering of the vehicle 402 via one or more of the methods described above and below. In other examples, one or more of these attributes may be entered by a user of the graphical user interface 400 via vehicle attributes panel 404, which in turn may cause the accident reconstruction system 200 to generate or regenerate virtual reality rendering of the vehicle 402 (e.g., by collecting data stored in association with the particular vehicle, one or more vehicles that share one or more attributes with the particular vehicle, or both). Other examples are possible.

These example graphical user interfaces are merely for purposes of illustration. The features described herein may involve graphical user interfaces that are configured or formatted differently, include more or less information and/ or additional or fewer instructions, include different types of information and/or instructions, and relate to one another in different ways.

D. Example: Experimental Data

Figure 5:
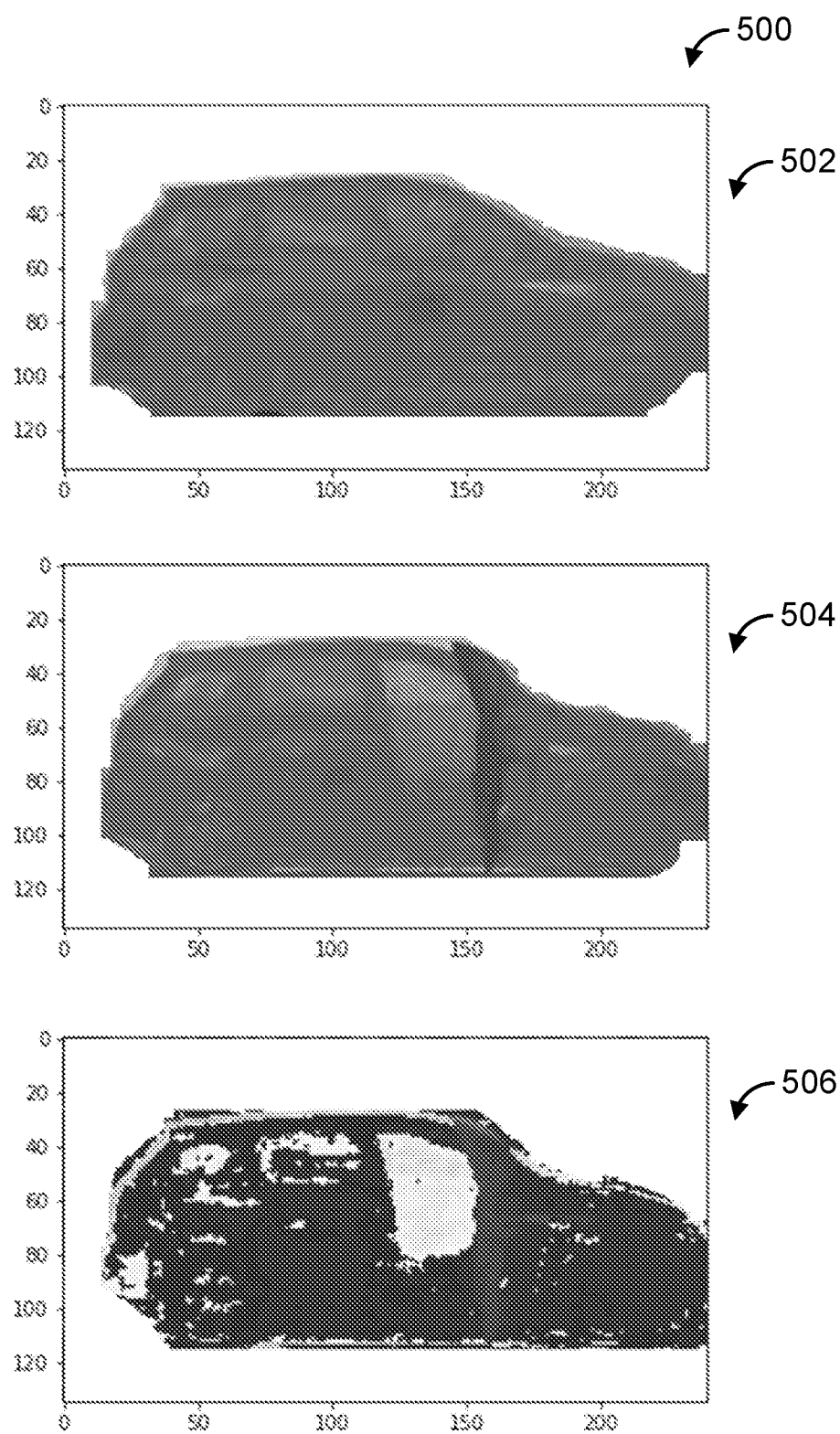
FIG. 5 is example experimental data associated with the accident reconstruction systems of FIGS. 2-4.

In an example experiment, in FIG. 5, experimental results 500 of comparative analysis of two NeRF models of the same vehicle before and after an event are provided. In this example experiment, the axes that accompany first result 502, second result 504, and third result 506, in the X and Y axes are the pixel coordinates of depth map with the origin starting at [0, 0] and then extending down and to the right to [240, 135]. In a further aspect, the images presented in FIG. 5 are the result of downsampling a 1920×1080 image eight times. Further aspects of this experiment are described below.

In particular, in the example experiment, a first NeRF model was generated based on a plurality of images of a vehicle with a closed passenger side door and the results are illustrated in a first result 502. Thereafter, a second NeRF model was generated based on a plurality of images of the same vehicle with the same passenger side door open and the results are illustrated in a second result 504. Finally, as illustrated in third result 506, the first and the second NeRF models were compared to generate a rendering of the vehicle illustrating the extent and area of differences between the first result 502 and the second result 504.

E. Example Method

Figure 6:
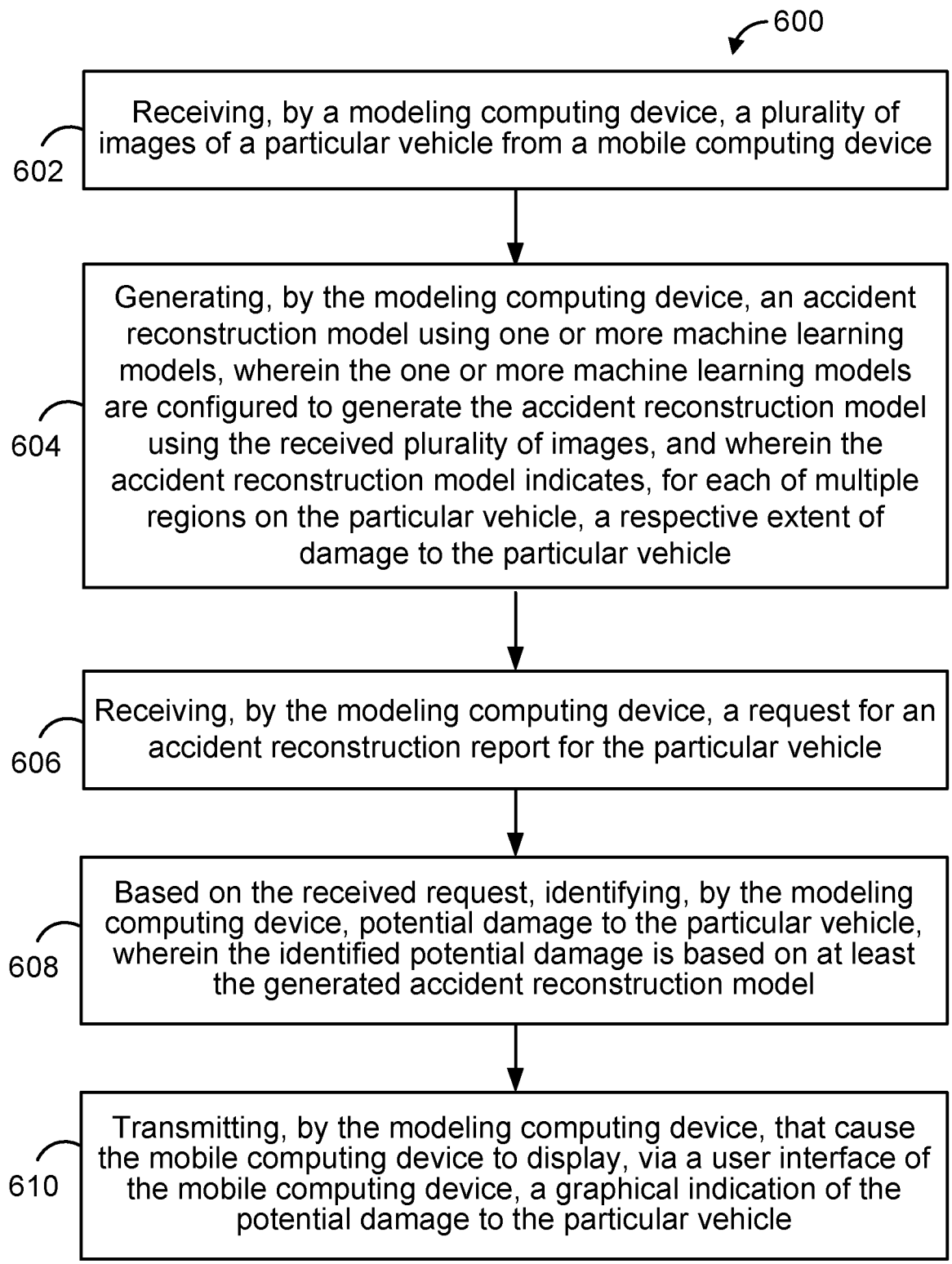
FIG. 6 is a flow chart of an example method.

FIG. 6 is a flow chart illustrating an example method 600.

At block 602, the method 600 can include, collecting, by a modeling computing device, receiving a plurality of images of a particular vehicle from the mobile computing device. In some examples, the plurality of images comprises at least two images, and wherein each image is captured from a different angle by the camera of the mobile computing device in relation to the particular vehicle. In other examples, the plurality of images comprises a video, and wherein the video is captured by the camera of the mobile computing device, and wherein an angle of the camera in relation to the particular vehicle varies over a length of the captured video.

At block 604, the method 600 can include, generating, by the modeling computing device, an accident reconstruction model using one or more machine learning models, wherein the one or more machine learning models are configured to generate the accident reconstruction model using the received plurality of images, and wherein the accident reconstruction model indicates, for each of multiple regions on the particular vehicle, a respective extent of damage to the particular vehicle. In some examples, the one or more machine learning models comprises a neural radiance fields machine learning model. In other examples, the one or more machine learning models comprises a structure-from-motion machine learning model. In still other examples, the one or more machine learning models comprises a simultaneous localization and mapping machine learning model. In some examples, generating an accident reconstruction model using one or more machine learning models further comprises, prior to receiving the plurality of images of the particular vehicle from the mobile computing device, training the one or more machine learning models using a plurality of images associated with one or more attributes of the particular vehicle. In some examples, the accident reconstruction model is generated by comparing the received plurality of images to the plurality of images associated with one or more attributes of the particular vehicle. In some examples, the one or more attributes of the particular vehicle include one or more of the following: (i) manufacturer of the particular vehicle; (ii) model of the particular vehicle; (iii) year of the particular vehicle; (iv) mileage of the particular vehicle; (v) color of the particular vehicle; and (vi) vehicle identification number (VIN) of the particular vehicle. In some examples, generating an accident reconstruction model using one or more machine learning models further comprises, prior to receiving the plurality of images of the particular vehicle from the mobile computing device, training the one or more machine learning models using a plurality of previously captured images of the particular vehicle. In some examples, the accident reconstruction model is generated by comparing the received plurality of images to the previously captured plurality of images of the particular vehicle.

At block 606, the method 600 can include receiving, by the modeling computing device, receiving a request for an accident reconstruction report for the particular vehicle. In some examples, receiving a request for an accident reconstruction report for the particular vehicle comprises receiving a request for an accident reconstruction report for the particular vehicle based on the plurality of images of the particular vehicle from the mobile computing device.

At block 608, the method 600 can also include, based on the received request, identifying potential damage to the particular vehicle, wherein the identified damage is based on at least the generated accident reconstruction model.

At block 610, the method 600 can also include, transmitting, to the mobile computing device, instructions that cause the mobile computing device to display, via the user interface of the mobile computing device, a graphical indication of the potential damage to the particular vehicle.

III. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

I claim:

1. An accident scene reconstruction system configured for use with a vehicle, the accident scene reconstruction system comprising:
   a mobile computing device, wherein the mobile computing device comprises a camera, a network interface, and a graphical user interface; and
   a modeling computing device, wherein the modeling computing device comprises a processor and a non-transitory computer-readable medium, having stored thereon program instructions that, upon execution by the processor, cause the modeling computing device to perform a set of operations comprising:
      receiving a plurality of images of a particular vehicle from the mobile computing device;
      generating an accident reconstruction model using one or more machine learning models, wherein the one or more machine learning models are configured to generate the accident reconstruction model using the received plurality of images and technical specification materials associated with the particular vehicle, wherein the technical specification materials include an operating manual for the particular vehicle, and wherein the accident reconstruction model indicates, for each of multiple regions on the particular vehicle, a respective extent of damage to the particular vehicle;

receiving a request for an accident reconstruction report for the particular vehicle;

based on the received request, identifying potential damage to the particular vehicle, wherein the identified potential damage is based on at least the generated accident reconstruction model; and transmitting, to the mobile computing device, instructions that cause the mobile computing device to display, via the graphical user interface of the mobile computing device, a graphical indication of the potential damage to the particular vehicle.

2. The system of claim 1, wherein the plurality of images comprises at least two images, and wherein each image is captured from a different angle by the camera of the mobile computing device in relation to the particular vehicle.

3. The system of claim 1, wherein the plurality of images comprises a video, and wherein the video is captured by the camera of the mobile computing device, and wherein an angle of the camera in relation to the particular vehicle varies over a length of the captured video.

4. The system of claim 1, wherein the one or more machine learning models comprises a neural radiance fields machine learning model.

5. The system of claim 1, wherein the one or more machine learning models comprises a structure-from-motion machine learning model.

6. The system of claim 1, wherein the one or more machine learning models comprises a simultaneous localization and mapping machine learning model.

7. The system of claim 1, wherein generating an accident reconstruction model using one or more machine learning models further comprises, prior to receiving the plurality of images of the particular vehicle from the mobile computing device, training the one or more machine learning models using a plurality of images associated with one or more attributes of the particular vehicle.

8. The system of claim 7, wherein the accident reconstruction model is generated by comparing the received plurality of images to the plurality of images associated with one or more attributes of the particular vehicle.

9. The system of claim 8, wherein the one or more attributes of the particular vehicle include one or more of the following: (i) manufacturer of the particular vehicle; (ii) model of the particular vehicle; (iii) year of the particular vehicle; (iv) mileage of the particular vehicle; (v) color of the particular vehicle; and (vi) vehicle identification number (VIN) of the particular vehicle.

10. The system of claim 1, wherein generating an accident reconstruction model using one or more machine learning models further comprises, prior to receiving the plurality of images of the particular vehicle from the mobile computing device, training the one or more machine learning models using a plurality of previously captured images of the particular vehicle.

11. The system of claim 10, wherein the accident reconstruction model is generated by comparing the received plurality of images to the plurality of previously captured images of the particular vehicle.

12. The system of claim 1, wherein receiving a request for an accident reconstruction report for the particular vehicle comprises receiving a request for an accident reconstruction report for the particular vehicle based on the plurality of images of the particular vehicle from the mobile computing device.

13. The system of claim 1, wherein the modeling computing device and the mobile computing device are the same computing device.

14. The system of claim 1, wherein the modeling computing device and the mobile computing device are different computing devices.

15. A method comprising:

receiving, by a modeling computing device, a plurality of images of a particular vehicle from a mobile computing device;

generating, by the modeling computing device, an accident reconstruction model using one or more machine learning models, wherein the one or more machine learning models are configured to generate the accident reconstruction model using the received plurality of images and technical specification materials associated with the particular vehicle, wherein the technical specification materials include an operating manual for the particular vehicle, and wherein the accident reconstruction model indicates, for each of multiple regions on the particular vehicle, a respective extent of damage to the particular vehicle;

receiving, by the modeling computing device, a request for an accident reconstruction report for the particular vehicle;

based on the received request, identifying, by the modeling computing device, potential damage to the particular vehicle, wherein the identified potential damage is based on at least the generated accident reconstruction model; and transmitting, by the modeling computing device, to the mobile computing device, instructions that cause the mobile computing device to display, via a user interface of the mobile computing device, a graphical indication of the potential damage to the particular vehicle.

16. The method of claim 15, wherein generating an accident reconstruction model using one or more machine learning models further comprises, prior to receiving the plurality of images of the particular vehicle from the mobile computing device, training, by the modeling computing device, the one or more machine learning models using a plurality of images associated with one or more attributes of the particular vehicle.

17. The method of claim 16, wherein the accident reconstruction model is generated by comparing, by the modeling computing device, the received plurality of images to the plurality of images associated with one or more attributes of the particular vehicle.

18. The method of claim 17, wherein the one or more attributes of the particular vehicle include one or more of the following: (i) manufacturer of the particular vehicle; (ii) model of the particular vehicle; (iii) year of the particular vehicle; (iv) mileage of the particular vehicle; (v) color of the particular vehicle; and (vi) vehicle identification number (VIN) of the particular vehicle.

19. The method of claim 15, wherein generating an accident reconstruction model using one or more machine learning models further comprises, prior to receiving the plurality of images of the particular vehicle from the mobile computing device, training, by the modeling computing device, the one or more machine learning models using a plurality of previously captured images of the particular vehicle.

20. The method of claim 19, wherein the accident reconstruction model is generated by comparing, by the modeling computing device, the received plurality of images to the previously captured plurality of images of the particular vehicle.

* * * * *